(12) United States Patent
Roessinger et al.

(10) Patent No.: US 11,901,099 B2
(45) Date of Patent: Feb. 13, 2024

(54) SENSOR ASSEMBLY FOR A RESISTANCE TEMPERATURE SENSOR ELEMENT AND RESISTANCE TEMPERATURE SENSOR ELEMENT

(71) Applicant: TE Connectivity Sensors Germany GmbH, Dortmund (DE)

(72) Inventors: Stefan Andreas Roessinger, Dortmund (DE); Horst Sirtl, Dortmund (DE)

(73) Assignee: TE Connectivity Sensors Germany GmbH, Dortmund (DE)

( * ) Notice: Subject to any disclaimer, the term of this patent is extended or adjusted under 35 U.S.C. 154(b) by 0 days.

(21) Appl. No.: 17/737,135

(22) Filed: May 5, 2022

(65) Prior Publication Data
US 2022/0359106 A1    Nov. 10, 2022

(30) Foreign Application Priority Data
May 6, 2021 (EP) ..................................... 21172548

(51) Int. Cl.
*H01C 1/01* (2006.01)
*H01C 7/00* (2006.01)

(52) U.S. Cl.
CPC ............... *H01C 1/01* (2013.01); *H01C 7/008* (2013.01)

(58) Field of Classification Search
CPC .................................. H01C 1/01; H01C 7/008
See application file for complete search history.

(56) References Cited

U.S. PATENT DOCUMENTS

| 5,334,350 A * | 8/1994 | Friese ..................... G01N 27/12 338/229 |
| 10,842,020 B2 * | 11/2020 | Zitzmann .............. H05K 1/0271 |
| 2006/0139144 A1 * | 6/2006 | LaBarge ................ H01C 17/02 374/E7.018 |
| 2011/0305259 A1 * | 12/2011 | Wienand ................ H01C 7/008 374/185 |
| 2017/0153148 A1 | 6/2017 | Zitzmann et al. |

FOREIGN PATENT DOCUMENTS

FR          2796718 A1     1/2001

OTHER PUBLICATIONS

FR 2796718, machine translation. (Year: 2001).*
Extended European Search Report, Application No. 21172548.6-1001, dated Nov. 5, 2021, 8 pages.

* cited by examiner

*Primary Examiner* — Kyung S Lee
(74) *Attorney, Agent, or Firm* — Barley Snyder

(57) ABSTRACT

A sensor assembly for a resistance temperature sensor element includes a substrate and a measuring structure disposed on the substrate. The substrate includes a first material and a stabilized second material. The first material is at least one of aluminum oxide, spinel (magnesium aluminate) and yttrium-aluminum-garnet. The stabilized second material is at least one of stabilized zirconium dioxide and stabilized hafnium dioxide. The stabilized second material is stabilized by containing an oxide of an element having a valence different from four. A coefficient of thermal expansion of the substrate deviates by less than 5% from a coefficient of thermal expansion of the measuring structure.

19 Claims, 2 Drawing Sheets

SENSOR ASSEMBLY FOR A RESISTANCE TEMPERATURE SENSOR ELEMENT AND RESISTANCE TEMPERATURE SENSOR ELEMENT

CROSS-REFERENCE TO RELATED APPLICATIONS

This application claims the benefit of the filing date under 35 U.S.C. § 119(a)-(d) of European Patent Application No. 21172548.6, filed on May 6, 2021.

FIELD OF THE INVENTION

The present invention relates to a sensor assembly for a resistance temperature sensor element and to a resistance temperature sensor element.

BACKGROUND

Sensor assemblies for resistance temperature sensor elements are known in the art. These sensor assemblies comprise measuring structures, in particular resistive elements. Such a measuring structure is usually made from platinum. A change in temperature induces a change in the electric resistance of the measuring structure. This electric resistance can be measured and the corresponding temperature of the element can then be calculated. The measuring structure is usually supported by a substrate.

Maintaining the structural integrity of sensor assemblies for resistance temperature sensor elements over their lifetime is critical. In particular, a large number of temperature changes may reduce the structural integrity of the assembly and lead to failure of the assembly and of the resistance thermometer.

SUMMARY

A sensor assembly for a resistance temperature sensor element includes a substrate and a measuring structure disposed on the substrate. The substrate includes a first material and a stabilized second material. The first material is at least one of aluminum oxide, spinel (magnesium aluminate) and yttrium-aluminum-garnet. The stabilized second material is at least one of stabilized zirconium dioxide and stabilized hafnium dioxide. The stabilized second material is stabilized by containing an oxide of an element having a valence different from four. A coefficient of thermal expansion of the substrate deviates by less than 5% from a coefficient of thermal expansion of the measuring structure.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention and its improvements are described in greater detail using exemplary embodiments and with reference to the drawings. The various features shown in the embodiments may be used independently of each other in specific applications. In the following figures, elements having the same function and/or the same structure will be referenced by the same reference signs.

Figure 1:
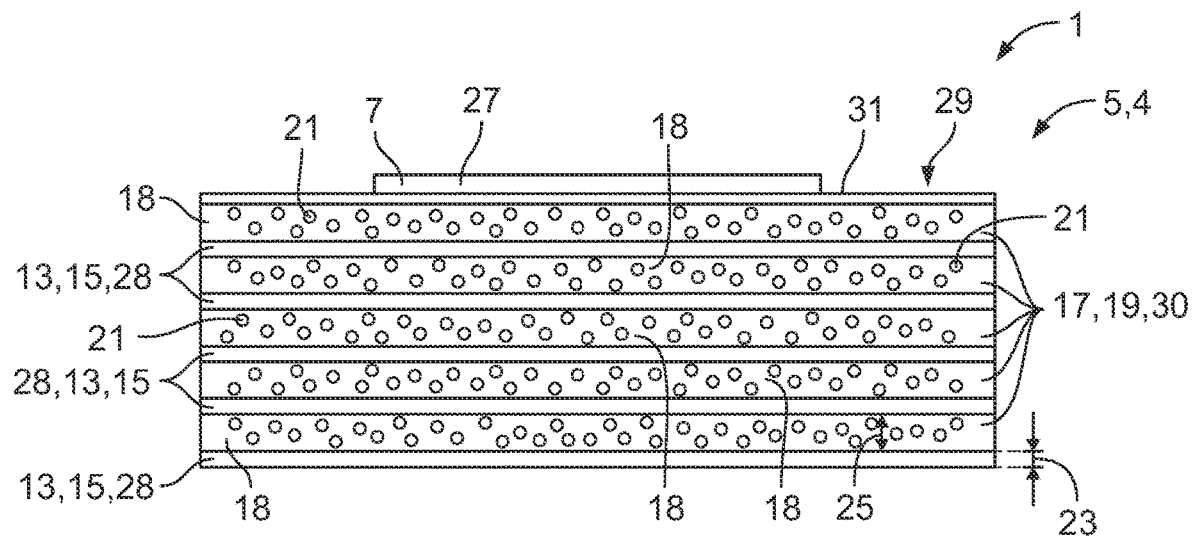
FIG. 1 is a sectional side view of a sensor assembly according to the invention.
Figure 2:
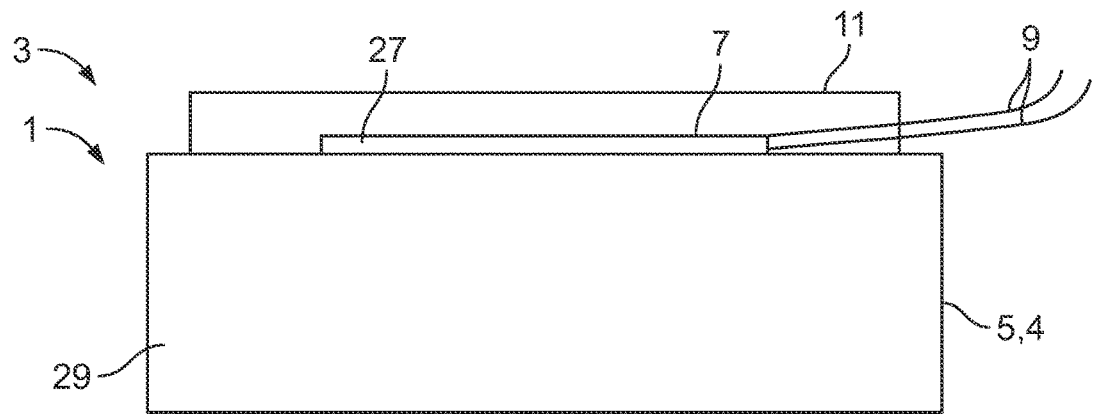
FIG. 2 is a side view of a resistance temperature sensor element having the sensor assembly of FIG. 1.

A sensor assembly 1 according to an embodiment is shown in FIG. 1. The sensor assembly 1 can be used for a resistance temperature sensor element 3, which is shown in FIG. 2. The resistance temperature sensor element 3 according to the invention may be part of a resistance thermometer.

The sensor assembly 1 comprises a substrate 4 and a measuring structure 7 disposed on the substrate 4. The substrate 4 of the first embodiment is a multilayered substrate 5, consisting of a plurality of layers.

The resistance temperature sensor element 3 may further comprise additional elements, of which only some are exemplarily shown in FIG. 2. The resistance temperature sensor element 3 may, in addition to the assembly 1, be provided with lead wires 9 that electrically connect the measuring structure 7.

In addition, the resistance temperature sensor element 3 may comprise a cover layer 11, shown in FIG. 2, which covers at least the measuring structure 7. The cover layer 11 may also cover at least parts of the lead wires 9. The cover layer 11 may be made from one or multiple glass materials.

In the following, the multilayered substrate 5 is described. The multilayered substrate 5, shown in FIG. 1, comprises at least one layer 13 that is predominantly made from a first material 15. The first material 15 is at least one of aluminum oxide, spinel (magnesium aluminate), and yttrium aluminum garnet. The first material 15 may, hence, also be a mixture of more than one of the materials. The term aluminum oxide refers to the material described by sum formula $Al2O3$. The term spinel refers to a material described by the sum formula $MgAl2O4$. The term yttrium aluminum garnet (known as "YAG") refers to the material $Y3Al2[Al04]3$, described by sum formula $Y3Al5O12$.

The multilayered substrate 5 also comprises at least one layer 17, which is predominantly made from a stabilized second material 19. The stabilized second material 19 may comprise at least one of zirconium dioxide and hafnium dioxide. In order to form the stabilized second material 19, at least one stabilizing material 21 is added to a raw second material 18. The raw second material 18 may be at least one of zirconium dioxide and hafnium dioxide. Due to the addition of the stabilizing material 21 to the raw second material 18, the stabilized second material 19 is formed. The term zirconium dioxide, which is the main constituent of the stabilized second material, refers to $ZrO2$. The term hafnium dioxide refers to $HfO2$.

The stabilized second material 19 may have a stabilized crystal structure, in particular in a desired temperature range. The stabilizing material 21 is indicated by circles in FIG. 1. These circles shall only show that the stabilizing material 21 is dissolved in the raw second material 18 but does not indicate any structure.

The stabilizing material 21 may be an oxide of an element having a valence different from 4, in particular 3 or 5. For the raw second material 18, the valence is four. The stabilizing material 21, in an embodiment, is an oxide of yttrium, cerium, tantalum, or niobium. The stabilizing material 21 may alternatively be other elements, even a material that is not an oxide. The stabilizing material 21 may stabilize a tetragonal and/or cubic crystal structure in the stabilized second material 19, even at room temperature. In particular, the stabilizing material 21 stabilizes a tetragonal and/or cubic crystal structure of the zirconium dioxide and/or the hafnium dioxide. With this structure, the stabilized material has a homogeneous CTE. The same is also valid for hafnium dioxide.

The layers 13 and 17 are disposed one over another, in an embodiment in an alternating manner. A total number of layers 13 and 17 may be between 5 and 25 layers. Of course, the multilayered substrate 5 may also contain less than 5 or more than 25 layers.

The layers 13 and 17 may have different thicknesses. In an embodiment, a thickness 23 of the layers 13 is smaller than a thickness 25 of the layers 17. In an embodiment, all layers 13 containing the first material 15 each have the same thickness 23, and the layers 17 containing the stabilized second material 19 are each of the same thickness 25, respectively. However, this is not mandatory. Not all layers 13 containing the first material 15 must have the same thickness 23. As well, the layers 17 containing the stabilized second material 19 are not required to have the same thickness 25. In an embodiment, the thicknesses 23 and 25 are between 10 and 100 μm, between 20 and 70 μm, or 30 and 80 μm.

The measuring structure 7 has a coefficient of thermal expansion (CTE) 27. The multilayered substrate 5 has a CTE 29. The coefficients of thermal expansion (CTEs) 27 and 29 are matched such that they differ about less than 5% from each other.

The measuring structure 7 may be made from platinum, for example pure platinum, but is not limited to platinum. The CTE of platinum is 9.5 ppm/K. Hence, the CTE 29 of the substrate 4, here the multilayered substrate 5, may deviate not more than 5% from the CTE of platinum and may be between 9.025 and 9.975 ppm/K. In the alternative, the measuring structure 7 may for example be made from a platinum alloy, nickel, a nickel alloy, iridium or an iridium alloy.

In an embodiment, the CTE of the substrate 4/multilayered substrate 5 deviates less than 2.5% from the CTE of the measuring structure 7.

The CTE 29 of the substrate 4/multilayered substrate 5 is adjusted by the numbers and thicknesses 23 and 25 of the layers 13 and 17. The materials 15 and 19 forming the layers 13 and 17 both have different CTEs.

In an embodiment, the CTE 28 of the first material 15 is about 7.8 ppm/K, whereas the CTE 30 of the stabilized second material 19 is about 10.5 ppm/K. Depending on the numbers and thicknesses 23 and 25 of the layers 13 and 17, an overall CTE about that of platinum, namely 9.5 ppm/K, can be achieved.

This good matching is achieved due to the fact that the stabilizing material 21 in the stabilized second material 19 stabilizes the crystal structure of this material such that the CTE of the stabilized second material 19 is around 10.5 ppm/K in all crystal directions and over the desired temperature range.

However, pure zirconium dioxide has a CTE of 10.3 ppm/K only in some directions of its crystal structure at room temperature. The average CTE of pure zirconium dioxide at room temperature is only about 8.8 ppm/K. Hence, mixing pure zirconium dioxide with aluminum oxide may not result in a substrate 4 having a CTE that is matched with that of platinum. The aforementioned problem also exists for pure hafnium dioxide.

At temperatures above 1200° C., pure zirconium dioxide has an average CTE of 10.5 ppm/K, because the material then has an overall tetragonal crystal structure. Above 2400° C., the crystal structure becomes cubic. However, for measurements below 1200° C., this is not useful. The inventive solution overcomes this problem by using stabilized zirconium dioxide or stabilized hafnium dioxide, as described above.

Just by way of example, the sum of thicknesses 25 of the layers 17 may be around 150% of a sum of the thicknesses 23 of the layers 13.

The stabilizing material 21, in an embodiment, may be conductive, and the second material 19 may have an ion conductivity that cannot be neglected. This ion conductivity may result from the difference in valences that creates voids or excess oxygen. Since the stabilizing material 21 in the stabilized second material 19 may lead to a conductive multilayered substrate 5, an additional insulating layer 31 may be present between the measuring structure 7 and the remaining layers 13 and 17 of the multilayered substrate 5, as shown in FIG. 1. The insulating layer 31 electrically insulates the measuring structure 7 from electrically conductive layers of the remaining substrate 4/multilayered substrate 5. The insulating layer 31, in an embodiment, contains aluminum oxide (Al2O3), spinel (MgAl2O4) or magnesium titanate (MgTiO3) or a mixture of two or three of these materials. The material for the insulating layer 31 is not limited to previous examples.

Figure 3:
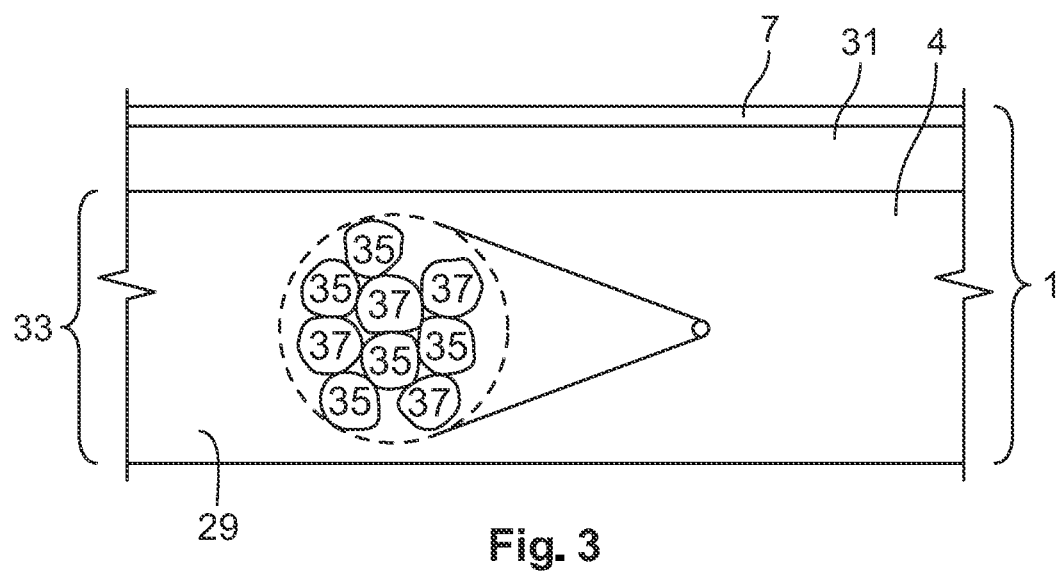
FIG. 3 is a schematic sectional view of a sensor assembly according to another embodiment.

FIG. 3 shows another embodiment of the invention. For the sake of brevity, only the difference to the first embodiment is described in detail. In the embodiment of FIG. 3, the substrate 4 is not a multilayered substrate 5, but contains a grain structure 33. The grain structure 33 contains grains 35 predominantly made from the first material 15 and grains 37 predominantly made from the stabilized second material 19. However, it is not excluded that the substrate 4 contains additional materials.

In FIG. 3, only some grains 35 and 37 are schematically indicated for explanatory reasons. The indicated grains are not representative for any size or shape or quantitative distribution.

The CTE 29 of the substrate 4 in the embodiment of FIG. 3 may be defined by adjusting the ratio of grains 35 and grains 37. Just as the assembly of the first embodiment, an additional insulating layer 31 may be present between the substrate 4 and the measuring structure 7.

The CTE matching described above is important, since in case of a mismatch of the CTEs, a change in temperature may induce different volume changes in the substrate and in the measuring structure. This results in stress effects on the measuring structure. This can cause a shift in resistance and temperature coefficient of resistance. Further, the measuring structure may undergo geometric changes. One effect can be hysteresis in resistance and temperature coefficient of resistance with temperature cycling. Overall, the bond between the measuring structure and the substrate may be damaged. It is also possible that the measuring structure gets destroyed.

Due to the stabilized second material 19, the invention allows to achieve a good matching of the coefficients of thermal expansion even across a wide temperature range, for example from −200° C. up to temperatures higher than 1200° C. The sensor assembly 1 maintains its structural integrity over a large number of cycles of temperature changes. The sensor assembly 1 according to the invention allows for a fine adjusted matching of the coefficients of thermal expansion of the measuring structure 7 and the substrate 4. Thereby, a reliable sensor assembly 1 is achieved.

The substrate 4 may be produced by tape casting. Hence, a material is brought onto a carrier and a knife is moved along the material, bringing the material for the substrate 4 into shape. If the substrate 4 is made from a grain structure 33, a material containing a mixture with grains of both materials is used and shaped as a single layer. If a multi-layered substrate is needed, the first material 15 and the stabilized second material 19 are tape casted one over the other in repeated cycles.

What is claimed is:

1. A sensor assembly for a resistance temperature sensor element, comprising:
a substrate including a first material and a stabilized second material, the first material is at least yttrium-aluminum-garnet, the stabilized second material is at least one of stabilized zirconium dioxide and stabilized hafnium dioxide, the stabilized second material is stabilized by containing an oxide of at least cerium, and having a valence different from four; and
a measuring structure disposed on the substrate, a coefficient of thermal expansion of the substrate deviates by less than 5% from a coefficient of thermal expansion of the measuring structure.

2. The sensor assembly of claim 1, wherein the stabilized second material is stabilized by containing the oxide of the element having the valence of three or five.

3. The sensor assembly of claim 1, wherein the stabilized second material has a tetragonal or cubic crystal structure.

4. The sensor assembly of claim 1, further comprising an insulating layer between the measuring structure and the substrate.

5. The sensor assembly of claim 4, wherein the insulating layer contains spinel.

6. The sensor assembly of claim 1, wherein the measuring structure is made from at least one of: platinum, a platinum alloy, nickel, a nickel alloy, iridium, and an iridium alloy.

7. The sensor assembly of claim 1, wherein the substrate has a grain structure formed by a mixture of a plurality of first grains made from the first material and a plurality of second grains made from the stabilized second material.

8. The sensor assembly of claim 1, wherein the substrate is a multilayered substrate made from a plurality of layers, at least one of the layers contains the first material and at least one of the layers contains the stabilized second material.

9. The sensor assembly of claim 8, wherein the at least one of the layers containing the first material and the at least one of the layers containing the stabilized second material are disposed over one another.

10. The sensor assembly of claim 9, wherein a first coefficient of thermal expansion of the at least one of the layers containing the first material deviates by less than 5% from a second coefficient of thermal expansion of the at least one of the layers containing the stabilized second material.

11. The sensor assembly of claim 10, wherein the first coefficient of thermal expansion is different from the second coefficient of thermal expansion.

12. The sensor assembly of claim 10, wherein the coefficient of thermal expansion of the substrate is adjusted by a quantity and a thickness of the layers.

13. The sensor assembly of claim 9, wherein the at least one of the layers containing the first material and the at least one of the layers containing the stabilized second material are disposed in an alternating manner.

14. The sensor assembly of claim 8, wherein a total number of the layers containing the first material and the layers containing the stabilized second material is between 5 and 25 layers.

15. The sensor assembly of claim 9, wherein a sum of thicknesses of the layers containing the stabilized second material is approximately 150% of a sum of thicknesses of the layers containing the first material.

16. The sensor assembly of claim 9, wherein a thickness of each of the layers containing the first material and each of the layers containing the stabilized second material is between 10 µm and 100 µm.

17. A sensor assembly for a resistance temperature sensor element, comprising:
a substrate including a first material and a stabilized second material, the first material is at least one of spinel and yttrium-aluminum-garnet, the stabilized second material includes stabilized hafnium dioxide, the stabilized second material is stabilized by containing an oxide of an element having a valence different from four;
a measuring structure disposed on the substrate, a coefficient of thermal expansion of the substrate deviates by less than 5% from a coefficient of thermal expansion of the measuring structure; and
an insulating layer containing spinel arranged between the measuring structure and the substrate.

18. The sensor assembly of claim 17, wherein the first material is at least yttrium-aluminum-garnet.

19. A sensor assembly for a resistance temperature sensor element, comprising:
a substrate including a grain structure having a mixture of grains of a first material and grains of a stabilized second material formed as a single layer, the first material is at least yttrium-aluminum-garnet, the stabilized second material is at least one of stabilized zirconium dioxide and stabilized hafnium dioxide, the stabilized second material is stabilized by containing an oxide of at least one of: yttrium, cerium, niobium, and tantalum having a valence different from four; and
a measuring structure disposed on the substrate, a coefficient of thermal expansion of the substrate deviates by less than 5% from a coefficient of thermal expansion of the measuring structure.

* * * * *